(12) United States Patent
Fukuda et al.

(10) Patent No.: US 11,722,086 B2
(45) Date of Patent: Aug. 8, 2023

(54) MOTOR DRIVE DEVICE

(71) Applicant: Mitsubishi Electric Corporation, Tokyo (JP)

(72) Inventors: Yuki Fukuda, Tokyo (JP); Tatsuya Fujimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/605,435

(22) PCT Filed: May 17, 2019

(86) PCT No.: PCT/JP2019/019785
§ 371 (c)(1),
(2) Date: Oct. 21, 2021

(87) PCT Pub. No.: WO2020/234943
PCT Pub. Date: Nov. 26, 2020

(65) Prior Publication Data
US 2022/0200506 A1 Jun. 23, 2022

(51) Int. Cl.
*H02P 27/08* (2006.01)
*H02M 7/06* (2006.01)

(52) U.S. Cl.
CPC .............. *H02P 27/08* (2013.01); *H02M 7/06* (2013.01)

(58) Field of Classification Search
CPC .......... H02P 27/00; H02P 27/04; H02P 27/06; H02P 27/08; H02P 2201/03;
(Continued)

(56) References Cited

U.S. PATENT DOCUMENTS

| 6,515,379 B1 | 2/2003 | Nojima et al. |
| 10,598,399 B2 | 3/2020 | Miyata |
| 2019/0049136 A1 | 2/2019 | Miyata |

FOREIGN PATENT DOCUMENTS

| CN | 109073255 A | 12/2018 |
| JP | S6383999 U | 6/1988 |

(Continued)

OTHER PUBLICATIONS

Extended European Search Report dated Apr. 25, 2022, issued in European Patent Application No. 19929379.6, 9 pages.
(Continued)

*Primary Examiner* — Antony M Paul
(74) *Attorney, Agent, or Firm* — Buchanan Ingersoll & Rooney PC (57) ABSTRACT

A direct-current bus power supply as a power supply device supplies power to a load capable of switching a state between a driving state in which driving is performed by receiving power supply and a standby state in which driving is stopped while receiving power supply. The power supply device includes: a diode bridge circuit and capacitors as a rectifier circuit that enables an alternating-current voltage to be rectified by respective rectification systems of full-wave rectification and voltage doubler rectification; and a switching unit that perform switching between the full-wave rectification and the voltage doubler rectification on the basis of a voltage value of the alternating-current voltage and the state of the load.

10 Claims, 6 Drawing Sheets

(58) Field of Classification Search
CPC ............ H02P 2201/05; H02P 2201/07; H02P 2201/09; H02P 6/00; H02P 6/005; H02P 6/04; H02P 6/08; H02P 6/12; H02P 6/24; H02P 6/28; H02P 7/00; H02P 7/29; H02P 1/00; H02P 1/16; H02P 1/18; H02P 1/24; H02P 1/28; H02P 1/42; H02P 1/46; H02P 3/00; H02P 3/18

See application file for complete search history.

(56) References Cited

FOREIGN PATENT DOCUMENTS

| | | | | |
|---|---|---|---|---|
| JP | H08228487 A | 9/1996 | | |
| JP | 2001145360 A | 5/2001 | | |
| JP | 2001309668 A | * 11/2001 | ............ | Y02B 70/10 |
| JP | 2007267566 A | 10/2007 | | |
| JP | 2010178594 A | 8/2010 | | |
| JP | 2012029440 A | 2/2012 | | |
| JP | 2016178716 A | 10/2016 | | |
| JP | 6297999 B2 | 3/2018 | | |

OTHER PUBLICATIONS

International Search Report (PCT/ISA/210) with translation and Written Opinion (PCT/ISA/237) dated Jul. 16, 2019, by the Japan Patent Office as the International Searching Authority for International Application No. PCT/JP2019/019785. (10 pages).

Notice of Reasons for Refusal issued in CN Application No. 201980095838.4; dated Jun. 2, 2023. 22 Pages (with Translation).

* cited by examiner

MOTOR DRIVE DEVICE

FIELD

The present invention relates to a power supply device and a motor drive device that convert an alternating-current voltage into a direct-current voltage.

BACKGROUND

As commercial alternating-current power supplies, there are a 100-V alternating-current power supply that outputs an alternating-current voltage in a range of 100 V to 120 V and a 200-V alternating-current power supply that outputs an alternating-current voltage in a range of 200 V to 240 V. A motor drive device performs rectification from an alternating-current voltage to a direct-current voltage in a rectifier circuit in a power supply device. The motor drive device converts a direct-current voltage into an alternating-current voltage in an inverter circuit, and outputs the alternating-current voltage to a motor. The motor drive device is configured to be compatible with both a 100-V alternating-current power supply and a 200-V alternating-current power supply.

Patent Literature 1 discloses a power supply device that rectifies an alternating-current voltage by switching a rectification system between full-wave rectification and voltage doubler rectification on the basis of a result of detecting a voltage value of an alternating-current voltage. The power supply device according to Patent Literature 1 determines whether an alternating-current power supply is a 100-V alternating-current power supply or a 200-V alternating-current power supply on the basis of the result of detecting the voltage value. The power supply device according to Patent Literature 1 switches the rectification system to the voltage doubler rectification when it is determined that the alternating-current power supply is a 100-V alternating-current power supply. The power supply device according to Patent Literature 1 switches the rectification system to the full-wave rectification when it is determined that the alternating-current power supply is a 200-V alternating-current power supply.

CITATION LIST

Patent Literature

Patent Literature 1: Japanese Patent No. 6297999

SUMMARY

Technical Problem

The power supply device according to Patent Literature 1 described above determines whether the alternating-current power supply is a 100-V alternating-current power supply or a 200-V alternating-current power supply at a timing when application of the alternating-current voltage is started, and switches the rectification system on the basis of a result of the determination. In a case where it is determined that the alternating-current power supply is a 100-V alternating-current power supply, there occurs wasteful power consumption due to boosting for the voltage doubler rectification even in a standby state in which the motor is not driven. Therefore, according to the conventional technique according to Patent Literature 1 described above, there is a problem that power consumption increases due to wasteful power consumption.

The present invention has been made in view of the above, and an object thereof is to obtain a power supply device capable of reducing power consumption.

Solution to Problem

In order to solve the above-described problem and achieve the object, a power supply device according to the present invention supplies power to a load capable of switching a state between a driving state in which driving is performed by receiving power supply and a standby state in which driving is stopped while receiving power supply. The power supply device according to the present invention includes a rectifier circuit that enables an alternating-current voltage to be rectified by respective rectification systems of full-wave rectification and voltage doubler rectification, and a switching unit that performs switching between the full-wave rectification and the voltage doubler rectification on the basis of a voltage value of the alternating-current voltage and the state of the load.

Advantageous Effects of Invention

The power supply device according to the present invention achieves an effect that power consumption can be reduced.

DESCRIPTION OF EMBODIMENTS

Hereinafter, a power supply device and a motor drive device according to each embodiment of the present invention will be described in detail with reference to the drawings. The present invention is not limited to the embodiments.

First Embodiment

Figure 1:
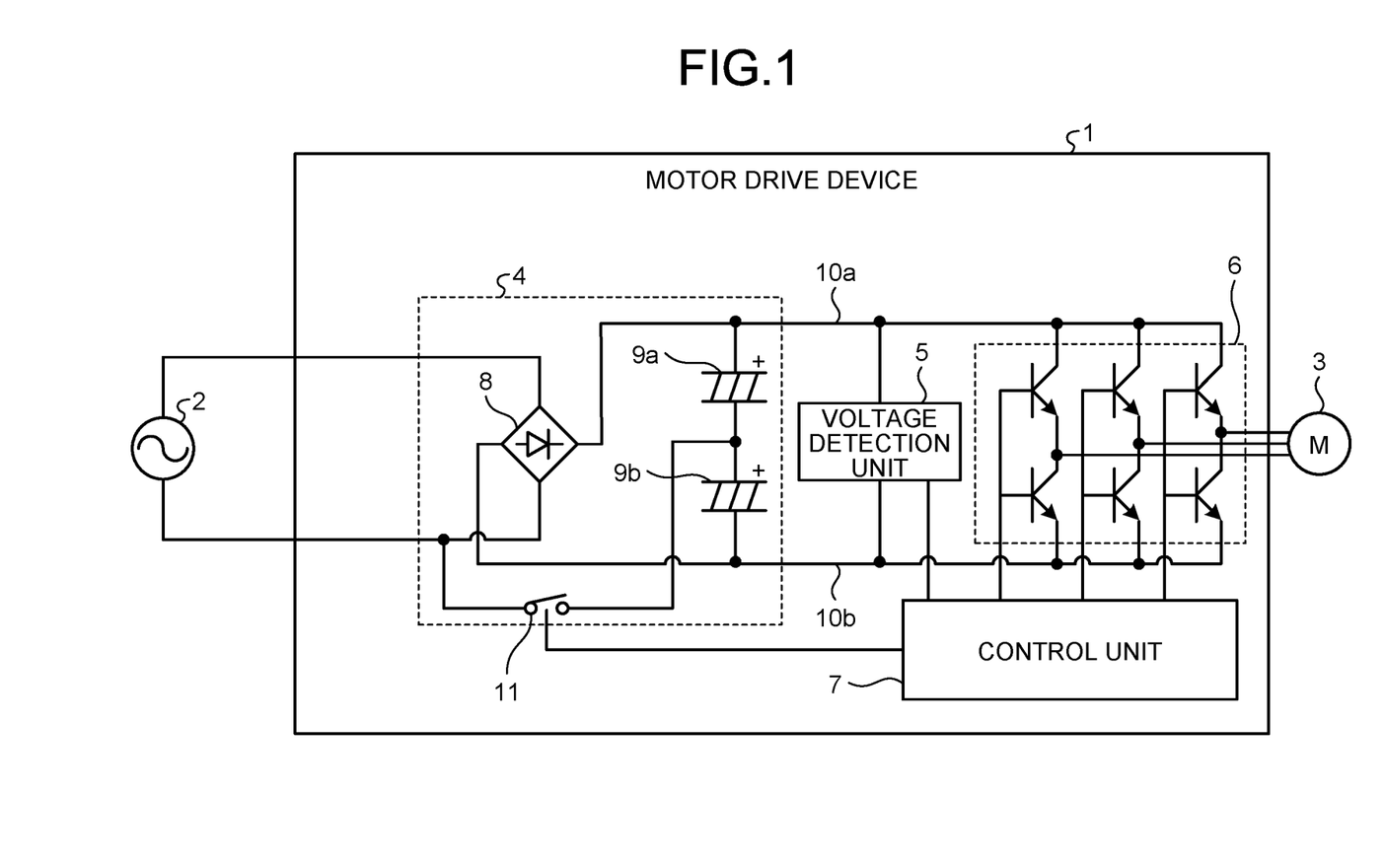
FIG. 1 is a block diagram of a motor drive device including a power supply device according to a first embodiment of the present invention.

FIG. 1 is a block diagram of a motor drive device including a power supply device according to a first embodiment of the present invention. A motor drive device 1 receives supply of alternating-current power from a commercial alternating-current power supply 2 to drive a motor 3. The motor 3 is a brushless motor. The motor drive device 1 is applied to an instrument including the motor 3, such as a hand dryer, a ventilator, an electric fan, a vacuum cleaner, or an automatic door opener/closer.

The motor drive device 1 includes a direct-current bus power supply 4 which is a power supply device that outputs a direct-current bus voltage, a voltage detection unit 5 that detects a voltage value of the direct-current bus voltage, an inverter circuit 6 that converts the direct-current bus voltage into a three-phase alternating-current voltage by switching and outputs the three-phase alternating-current voltage to the motor 3, and a control unit 7 that controls the motor drive device 1 as a whole.

The direct-current bus power supply 4 converts an alternating-current voltage into a direct-current voltage by a rectifying action, and outputs a direct-current bus voltage. The voltage detection unit 5 detects a voltage value of the direct-current bus voltage applied to an input side of the inverter circuit 6. The voltage detection unit 5 outputs a signal which is a detection result of the voltage value to the control unit 7. The inverter circuit 6 and the motor 3 are loads that are driven by receiving power supply from the direct-current bus power supply 4.

The direct-current bus power supply 4 includes a diode bridge circuit 8 that converts an alternating-current voltage into a direct-current voltage by a rectifying action, and two capacitors 9a and 9b that smooth the direct-current voltage. The diode bridge circuit 8 includes a plurality of diodes connected to each other in a bridge configuration. In FIG. 1, illustration of the plurality of diodes is omitted. A direct-current bus 10a connects a positive output terminal of the diode bridge circuit 8 and the inverter circuit 6. A direct-current bus 10b connects a negative output terminal of the diode bridge circuit 8 and the inverter circuit 6. Two input terminals of the diode bridge circuit 8 are each connected to the alternating-current power supply 2.

The capacitor 9a and the capacitor 9b are connected to each other in series between the direct-current bus 10a and the direct-current bus 10b. The diode bridge circuit 8 and the capacitors 9a and 9b constitute a rectifier circuit. The rectifier circuit performs rectification from an alternating-current voltage to a direct-current voltage and outputs the direct-current bus voltage. Furthermore, the rectifier circuit enables the alternating-current voltage to be rectified by each of rectification systems, i.e., the full-wave rectification and the voltage doubler rectification. The voltage detection unit 5 is connected in parallel with the capacitors 9a and 9b.

The direct-current bus power supply 4 includes a switching unit 11 that performs switching between the full-wave rectification and the voltage doubler rectification. The switching unit 11 is provided on a line that connects a connection point between the capacitor 9a and the capacitor 9b and one input terminal of the diode bridge circuit 8. As the switching unit 11, a mechanical relay including a normally open contact is used. The switching unit 11 is only required to be an element capable of performing switching between open and short circuit in accordance with a signal, and may be an element other than a relay including a normally open contact.

The switching unit 11 performs switching between open and short circuit in accordance with a signal input from the control unit 7, thereby performing switching between the full-wave rectification and the voltage doubler rectification. When the switching unit 11 is in an open state, the direct-current bus power supply 4 performs the full-wave rectification of the alternating-current voltage. When the switching unit 11 is in a short-circuit state, the direct-current bus power supply 4 performs the voltage doubler rectification of the alternating-current voltage. States of the inverter circuit 6 and the motor 3 can be switched between a driving state and a standby state. In the driving state, the inverter circuit 6 is applied with a direct-current bus voltage output from the direct-current bus power supply 4 and outputs a three-phase alternating-current voltage to the motor 3. In the driving state, the motor 3 is driven by being applied with the three-phase alternating-current voltage. The driving state is a state in which the inverter circuit 6 receives power supply and drives the motor 3.

In the standby state, the inverter circuit 6 stops the output of the three-phase alternating-current voltage to the motor 3 while being applied with the direct-current bus voltage output from the direct-current bus power supply 4. In the standby state, the driving of the motor 3 is stopped. The standby state is a state in which the inverter circuit 6 stops driving the motor 3 while receiving power supply.

The control unit 7 controls switching by the inverter circuit 6 by outputting a control signal to the inverter circuit 6. Furthermore, the control unit 7 controls the switching unit 11 by outputting a control signal to the switching unit 11. The control unit 7 detects a voltage value of the alternating-current voltage input to the direct-current bus power supply 4 on the basis of the voltage value detected by the voltage detection unit 5. The control unit 7 determines whether a state of a load is the driving state or the standby state. The control unit 7 controls the switching unit 11 on the basis of the voltage value of the alternating-current voltage and the state of the load. The switching unit 11 performs switching between the full-wave rectification and the voltage doubler rectification on the basis of the voltage value of the alternating-current voltage and the state of the load by the control of the control unit 7.

A function of the control unit 7 is realized using a processing circuitry. The processing circuitry is dedicated hardware mounted on the motor drive device 1. The processing circuitry may be a processor that executes a program stored in a memory.

Figure 2:
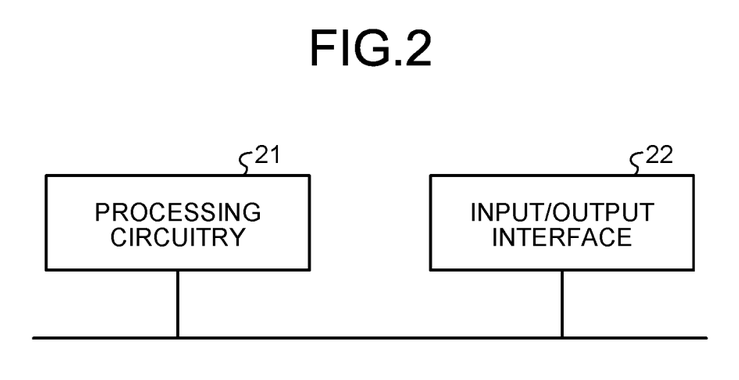
FIG. 2 is a first diagram illustrating an example of a hardware configuration of a control unit that controls the power supply device according to the first embodiment.

FIG. 2 is a first diagram illustrating an example of a hardware configuration of the control unit that controls the power supply device according to the first embodiment. FIG. 2 illustrates a hardware configuration in a case where the function of the control unit 7 is realized by using dedicated hardware. The control unit 7 includes a processing circuitry 21 that executes various processes and an input/output interface 22 responsible for signal input and signal output. The processing circuitry 21 and the input/output interface 22 are connected to each other via a bus.

The processing circuitry 21 as dedicated hardware is a single circuit, a composite circuit, a programmed processor, a parallel programmed processor, an application specific integrated circuit (ASIC), a field-programmable gate array (FPGA), or a combination thereof. The function of the control unit 7 is realized by using the processing circuitry 21. The input/output interface 22 outputs a control signal to the inverter circuit 6 and the switching unit 11. A signal from the voltage detection unit 5 is input to the input/output interface 22. An external input signal is input to the control unit 7. The external input signal is a signal input to the motor drive device 1 from an instrument outside the motor drive device 1.

Figure 3:
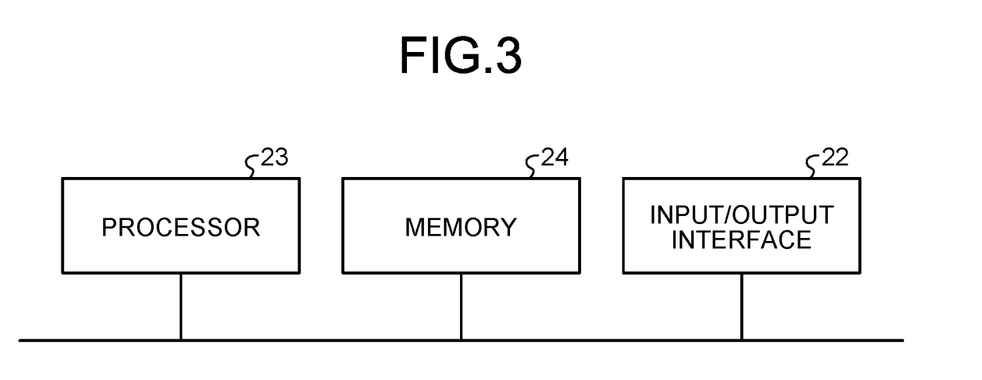
FIG. 3 is a second diagram illustrating an example of the hardware configuration of the control unit that controls the power supply device according to the first embodiment.

FIG. 3 is a second diagram illustrating an example of the hardware configuration of the control unit that controls the power supply device according to the first embodiment. FIG.

3 illustrates a hardware configuration in a case where the function of the control unit 7 is realized by using hardware that executes a program. The input/output interface 22, a processor 23, and a memory 24 are connected to each other via a bus.

The processor 23 is a central processing unit (CPU), a processing device, an arithmetic device, a microprocessor, a microcomputer, or a digital signal processor (DSP). The function of the control unit 7 is realized by the processor 23, and software, firmware, or a combination of software and firmware. The software or the firmware is described as a program and stored in the memory 24 as a built-in memory. The memory 24 is a nonvolatile or volatile semiconductor memory, and is a random access memory (RAM), a read only memory (ROM), a flash memory, an erasable programmable read only memory (EPROM), or an electrically erasable programmable read only memory (EEPROM (registered trademark)).

Figure 4:
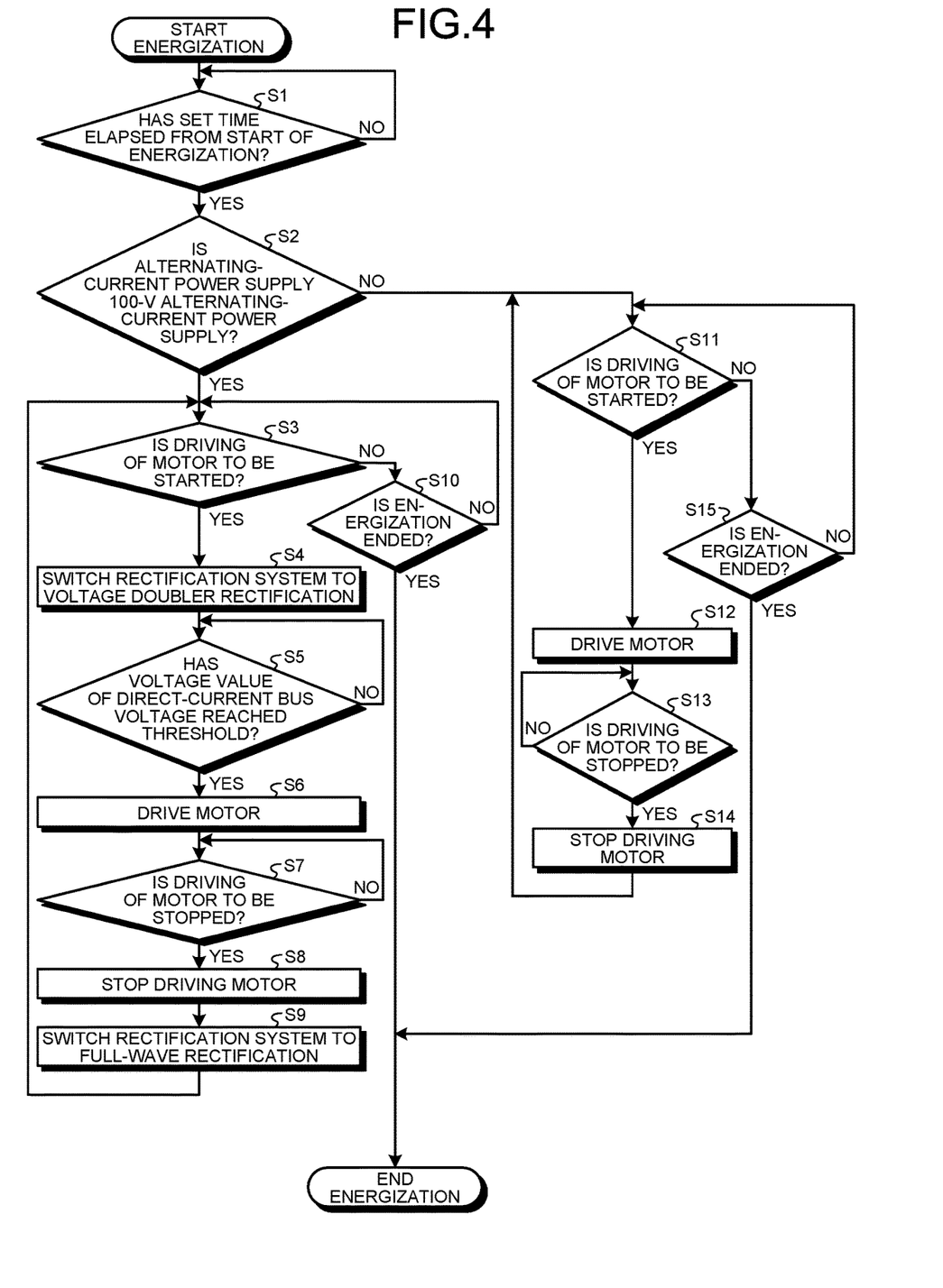
FIG. 4 is a flowchart illustrating an operation procedure of the motor drive device including the power supply device according to the first embodiment.

Next, an operation of the power supply device according to the first embodiment will be described. FIG. 4 is a flowchart illustrating an operation procedure of the motor drive device including the power supply device according to the first embodiment.

At a time of starting energization of the motor drive device 1, the switching unit 11 is in the open state. The full-wave rectification is set as a rectification system of the rectifier circuit. By the start of the energization of the motor drive device 1, the inverter circuit 6 enters the standby state. When the energization of the motor drive device 1 is started, the control unit 7 determines in step S1 whether a set time has elapsed from the start of the energization. The set time is a preset time and is a time required for charging the capacitors 9a and 9b. The set time is, for example, about one second. If the control unit 7 determines that the set time has elapsed (step S1, Yes), the motor drive device 1 advances the procedure to step S2. If the control unit 7 determines that the set time has not elapsed (step S1, No), the motor drive device 1 repeats step S1.

In step S2, the control unit 7 determines whether the alternating-current power supply 2 to which the motor drive device 1 is connected is a 100-V alternating-current power supply. The control unit 7 makes such a determination by comparing a voltage value of a direct-current voltage detected by the voltage detection unit 5 with a preset threshold. If it is determined that the alternating-current power supply 2 is a 100-V alternating-current power supply (step S2, Yes), the motor drive device 1 advances the procedure to step S3. If it is determined that the alternating-current power supply 2 is not a 100-V alternating-current power supply (step S2, No), the motor drive device 1 advances the procedure to step S11.

In a case where a maximum value of an effective value of an alternating-current voltage output by a 100-V alternating-current power supply is 120 V and a minimum value of an effective value of an alternating-current voltage output by a 200-V alternating-current power supply is 200 V, a threshold is set to 226 V. 226 V is an approximate value of a voltage value of a direct-current voltage when an alternating-current voltage of 160 V is full-wave rectified. 160 V is a center value between 120 V and 200 V, and is set as a reference value for distinguishing a 100-V alternating-current power supply from a 200-V alternating-current power supply. That is, the control unit 7 compares a voltage value with the reference value regarding the alternating-current voltage by comparing a voltage value with the threshold regarding the direct-current voltage.

In a case where the voltage value detected by the voltage detection unit 5 is equal to or less the threshold, the control unit 7 assumes that the voltage value of the alternating-current voltage is equal to or less the reference value, and determines that the alternating-current power supply 2 is a 100-V alternating-current power supply. In a case where the voltage value detected by the voltage detection unit 5 is larger than the threshold, the control unit 7 assumes that the voltage value of the alternating-current voltage is larger than the reference value, and determines that the alternating-current power supply 2 is not a 100-V alternating-current power supply but a 200-V alternating-current power supply If it is determined that the alternating-current power supply 2 is a 100-V alternating-current power supply (step S2, Yes), the control unit 7 determines in step S3 whether to start driving the motor 3. The control unit 7 makes such a determination in accordance with an external input signal. If it is determined to start driving the motor 3 (step S3, Yes), the motor drive device 1 advances the procedure to step S4. If it is determined not to start driving the motor 3 (step S3, No), the motor drive device 1 advances the procedure to step S10.

Here, an example of the external input signal will be described. In a case where the motor drive device 1 is applied to a hand dryer, the external input signal is a signal indicating whether a hand is detected in a hand insertion portion. An external input signal from a hand detection sensor provided in the hand dryer is input to the control unit 7. In a case where an external input signal indicating that a hand has been detected is input, the control unit 7 determines to start driving the motor 3. In a case where the external input signal indicating that a hand has been detected is not input, the control unit 7 determines not to start driving the motor 3.

In a case where the motor drive device 1 is applied to a ventilator, the external input signal is a signal from a switch or a remote controller of the ventilator, and is a signal indicating that operation of the ventilator has been directed. In a case where the external input signal indicating that the operation has been directed is input, the control unit 7 determines to start driving the motor 3. In a case where the external input signal indicating that the operation has been directed is not input, the control unit 7 determines not to start driving the motor 3.

In the case where the motor drive device 1 is applied to the ventilator, the external input signal may be a signal other than a signal from the switch or the remote controller. In a case of a ventilator that automatically starts operation when a $CO_2$ concentration detected by a $CO_2$ sensor is higher than a threshold, the external input signal is a signal indicating a detection result obtained by the $CO_2$ sensor, and may be a signal indicating that a $CO_2$ concentration higher than the threshold has been detected. The $CO_2$ sensor detects a $CO_2$ concentration in a space to be ventilated by the ventilator. In a case where the external input signal indicating that a $CO_2$ concentration higher than the threshold has been detected is input, the control unit 7 determines to start driving the motor 3. In a case where the external input signal indicating that a $CO_2$ concentration higher than the threshold has been detected is not input, the control unit 7 determines not to start driving the motor 3.

In a case of a ventilator that automatically starts operation when a person is detected by a human detection sensor, the external input signal is a signal from the human detection sensor and may be a signal indicating that a person has been detected. The human detection sensor detects a person present in a space to be ventilated by the ventilator. In a case where the external input signal indicating that a person has been detected is input, the control unit 7 determines to start driving the motor 3. In a case where the external input signal indicating that a person has been detected is not input, the control unit 7 determines not to start driving the motor 3.

In a case where the motor drive device 1 is applied to a vacuum cleaner, the external input signal is a signal from a switch of the vacuum cleaner, and is a signal indicating that operation of the vacuum cleaner has been directed. In a case where the external input signal indicating that the operation has been directed is input, the control unit 7 determines to start driving the motor 3. In a case where the external input signal indicating that the operation has been directed is not input, the control unit 7 determines not to start driving the motor 3.

In a case of a vacuum cleaner that automatically starts operation when contact between a head of the vacuum cleaner and a floor surface is detected by a floor surface detection sensor, the external input signal is a signal from the floor surface detection sensor, and may be a signal indicating that contact with the floor surface has been detected. In a case where the external input signal indicating that the contact with the floor surface has been detected is input, the control unit 7 determines to start driving the motor 3. In a case where the external input signal indicating that the contact with the floor surface has been detected is not input, the control unit 7 determines not to start driving the motor 3.

In a case where the motor drive device 1 is applied to an automatic door opener/closer, the external input signal is a signal from a position sensor that detects a position of a passerby or a position of an object, and is a signal indicating the position of the passerby or the position of the object. The position sensor detects a position of a passerby heading toward a door or a position of an object moving toward the door. In a case where the external input signal indicating a position of a passerby or a position of an object is input, the control unit 7 determines to start driving the motor 3. In a case where the external input signal indicating a position of a passerby or a position of an object is not input, the control unit 7 determines not to start driving the motor 3.

The control unit 7 is not limited to one that determines whether to start driving the motor 3 in accordance with the external input signal. The control unit 7 may determine whether to start driving the motor 3 using internal data stored in the control unit 7. The internal data is time information, information on an integrated operation time of a device including the motor drive device 1 or a use frequency of an instrument including the motor drive device 1, or the like.

If it is determined in step S3 to start driving the motor 3 (step S3, Yes), the switching unit 11 switches the rectification system from the full-wave rectification to the voltage doubler rectification in step S4. The control unit 7 outputs, to the switching unit 11, a control signal directing switching to the voltage doubler rectification. The switching unit 11 performs switching from the open state to the short-circuit state in accordance with the control signal input from the control unit 7.

In step S5, the control unit 7 determines whether a voltage value of the direct-current bus voltage has reached the threshold. The control unit 7 compares the voltage value of the direct-current voltage detected by the voltage detection unit 5 with the threshold. The threshold is a voltage value of a direct-current voltage when an alternating-current voltage output by a 200-V alternating-current power supply is full-wave rectified, and is, for example, 280 V. If it is determined that the voltage value of the direct-current bus voltage has reached the threshold (step S5, Yes), the motor drive device 1 advances the procedure to step S6. If it is determined that the voltage value of the direct-current bus voltage has not reached the threshold (step S5, No), the motor drive device 1 repeats step S5.

If it is determined that the voltage value of the direct-current bus voltage has reached the threshold (step S5, Yes), the motor drive device 1 drives the motor 3 in step S6. The control unit 7 drives the inverter circuit 6 by outputting, to the inverter circuit 6, a control signal directing output of the three-phase alternating-current voltage to the motor 3. The inverter circuit 6 converts the direct-current bus voltage into the three-phase alternating-current voltage in accordance with the control signal input from the control unit 7, and outputs the three-phase alternating-current voltage to the motor 3. The driving of the motor 3 is started, and thereby the state of the inverter circuit 6 is switched from the standby state to the driving state.

In steps S5 and S6, the motor drive device 1 starts driving the motor 3 after the voltage value of the direct-current bus voltage reaches the threshold, and thus it is possible to avoid the influence of voltage fluctuation due to the switching of the rectification system on the driving of the motor 3. As a result, the motor drive device 1 can stably drive the motor 3.

In step S7, the control unit 7 determines whether to stop driving the motor 3. The control unit 7 makes such a determination in accordance with the external input signal. If it is determined to stop driving the motor 3 (step S7, Yes), the motor drive device 1 advances the procedure to step S8. If it is determined not to stop driving the motor 3 (step S7, No), the motor drive device 1 repeats step S7.

In the case where the motor drive device 1 is applied to a hand dryer, the control unit 7 determines to stop driving the motor 3 when the external input signal indicating that a hand has been detected is no longer input. In a case where the input of the external input signal indicating that a hand has been detected is continued, the control unit 7 determines not to stop driving the motor 3. If it is determined not to stop driving the motor 3, the motor drive device 1 continues driving the motor 3.

In the case where the motor drive device 1 is applied to a ventilator, the external input signal is a signal from a switch or a remote controller of the ventilator, and is a signal indicating that operation of the ventilator has been directed to stop. In a case where the external input signal indicating that the operation has been directed to stop is input, the control unit 7 determines to stop driving the motor 3. In a case where the external input signal indicating that the operation has been directed to stop is not input, the control unit 7 determines not to stop driving the motor 3.

In a case of a ventilator that automatically stops operation when a $CO_2$ concentration is lower than the threshold, the control unit 7 may determine to stop driving the motor 3 when an external input signal indicating that a $CO_2$ concentration lower than the threshold has been detected is input. Alternatively, the control unit 7 may determine to stop driving the motor 3 when the external input signal indicating that a $CO_2$ concentration higher than the threshold has been detected is no longer input.

In a case of a ventilator that automatically stops operation when no person is detected by a human detection sensor, the control unit 7 may determine to stop driving the motor 3 when an external input signal indicating that no person has been detected is input. Alternatively, the control unit 7 may determine to stop driving the motor 3 when the external input signal indicating that a person has been detected is no longer input.

In the case where the motor drive device 1 is applied to a vacuum cleaner, the external input signal is a signal from a switch of the vacuum cleaner, and is a signal indicating that operation of the vacuum cleaner has been directed to stop. In a case where the external input signal indicating that the operation has been directed to stop is input, the control unit 7 determines to stop driving the motor 3. In a case where the external input signal indicating that the operation has been directed to stop is not input, the control unit 7 determines not to stop driving the motor 3.

In a case of a vacuum cleaner that automatically stops operation when contact with a floor surface is not detected, the control unit 7 may determine to stop driving the motor 3 when the external input signal indicating that the contact with the floor surface has been detected is no longer input. In a case where the input of the external input signal indicating that the contact with the floor surface has been detected is continued, the control unit 7 determines not to stop driving the motor 3.

In the case where the motor drive device 1 is applied to an automatic door opener/closer, it is determined to stop driving the motor 3 when an external input signal indicating that a passerby or an object has been detected is no longer input. In a case where the input of the external input signal indicating that a passerby or an object has been detected is continued, the control unit 7 determines not to stop driving the motor 3.

The control unit 7 is not limited to one that determines whether to stop driving the motor 3 in accordance with the external input signal. The control unit 7 may determine whether to stop driving the motor 3 using internal data stored in the control unit 7. The internal data is time information, information on an integrated operation time of a device including the motor drive device 1 or a use frequency of a device including the motor drive device 1, or the like.

If it is determined in step S7 to stop driving the motor 3 (step S7, Yes), the motor drive device 1 stops driving the motor 3 in step S8. The control unit 7 stops driving the inverter circuit 6 by stopping the output of the control signal to the inverter circuit 6. The inverter circuit 6 stops the conversion from the direct-current bus voltage into the three-phase alternating-current voltage and the output of the three-phase alternating-current voltage to the motor 3. The driving of the motor 3 is stopped, and thereby the state of the inverter circuit 6 is switched from the driving state to the standby state.

When the driving of the motor 3 is stopped in step S8, the switching unit 11 switches the rectification system from the voltage doubler rectification to the full-wave rectification in step S9. The control unit 7 outputs, to switching unit 11, a control signal directing switching to the full-wave rectification. The switching unit 11 performs switching from the short-circuit state to the open state in accordance with the control signal input from the control unit 7.

When the rectification system is switched in step S9, the motor drive device 1 returns the procedure to step S3. If it is determined to start driving the motor 3 (step S3, Yes), the motor drive device 1 repeats the procedure from step S4. If it is determined not to start driving the motor 3 (step S3, No), the control unit 7 determines in step S10 whether the energization of the motor drive device 1 is ended. If the energization is not ended (step S10, No), the motor drive device 1 returns the procedure to step S3. If the energization is ended (step S10, Yes), the motor drive device 1 ends the operation in accordance with the procedure illustrated in FIG. 4.

If it is determined in step S2 that the alternating-current power supply 2 is not a 100-V alternating-current power supply (step S2, No), the control unit 7 determines in step S11 whether to start driving the motor 3. Similarly to step S3, the control unit 7 makes such a determination in accordance with the external input signal. If it is determined to start driving the motor 3 (step S11, Yes), the motor drive device 1 advances the procedure to step S12. If it is determined not to start driving the motor 3 (step S11, No), the motor drive device 1 advances the procedure to step S15.

If it is determined to start driving the motor 3 (step S11, Yes), the motor drive device 1 drives the motor 3 in step S12. The control unit 7 drives the inverter circuit 6 by outputting, to the inverter circuit 6, a control signal directing output of the three-phase alternating-current voltage to the motor 3. The inverter circuit 6 converts the direct-current bus voltage into the three-phase alternating-current voltage in accordance with the control signal input from the control unit 7, and outputs the three-phase alternating-current voltage to the motor 3.

In step S13, the control unit 7 determines whether to stop driving the motor 3. Similarly to step S7, the control unit 7 makes such a determination in accordance with the external input signal. If it is determined to stop driving the motor 3 (step S13, Yes), the motor drive device 1 advances the procedure to step S14. If it is determined not to stop driving the motor 3 (step S13, No), the motor drive device 1 repeats step S13.

If it is determined to stop driving the motor 3 (step S13, Yes), the motor drive device 1 stops driving the motor 3 in step S14. When the driving of the motor 3 is stopped in step S14, the motor drive device 1 returns the procedure to step S11. If it is determined to start driving the motor 3 (step S11, Yes), the motor drive device 1 repeats the procedure from step S12.

If it is determined not to start driving the motor 3 (step S11, No), the control unit 7 determines in step S15 whether the energization of the motor drive device 1 is ended. If the energization is not ended (step S15, No), the motor drive device 1 returns the procedure to step S11. If the energization is ended (step S15, Yes), the motor drive device 1 ends the operation in accordance with the procedure illustrated in FIG. 4.

In a case where the alternating-current power supply 2 is a 100-V alternating-current power supply, the direct-current bus power supply 4 performs the full-wave rectification of the alternating-current voltage in the standby state in which the driving of the motor 3 is stopped. The direct-current bus power supply 4 can perform the voltage doubler rectification of the alternating-current voltage only in the case where the alternating-current power supply 2 is a 100-V alternating-current power supply and in the driving state in which the motor 3 is driven. As a result, in the standby state, the direct-current bus power supply 4 can reduce wasteful power consumption due to boosting for the voltage doubler rectification.

In addition, the direct-current bus power supply 4 performs rectification by the full-wave rectification in the standby state, thereby halving the direct-current bus voltage as compared with a case of performing rectification by the voltage doubler rectification. By halving the direct-current bus voltage, the direct-current bus power supply 4 can shorten a time required for discharging the capacitors 9a and 9b when the energization is ended.

The rectification system is switched to the full-wave rectification by stopping driving the motor 3, and thereby the rectification system at the start of energization of the motor drive device 1 is always the full-wave rectification. In a case where the direct-current bus power supply 4 is connected to a 200-V alternating-current power supply 2, it is possible to prevent the rectifier circuit in a state in which the voltage doubler rectification is set as the rectification system from being connected to the 200-V alternating-current power supply 2. As a result, the motor drive device 1 can prevent failures of a circuit configuration and the motor 3.

In the motor drive device 1, a voltage detection unit connected immediately after the alternating-current power supply 2 may be provided instead of the voltage detection unit 5 connected in parallel with the capacitors 9a and 9b. The voltage detection unit connected immediately after the alternating-current power supply 2 detects an alternating-current voltage output from the alternating-current power supply 2. In that case, the motor drive device 1 drives the motor 3 in step S6 when a set time has elapsed from the switching of the rectification system to the voltage doubler rectification, instead of step S5 described above. Such a set time is a time required for a voltage value of the direct-current bus voltage to reach the threshold. By starting driving the motor 3 after the elapse of the set time, it is possible to avoid the influence of voltage fluctuation due to the switching of the rectification system on the driving of the motor 3. As a result, the motor drive device 1 can stably drive the motor 3.

In the case where the voltage detection unit connected immediately after the alternating-current power supply 2 is provided, the control unit 7 determines in step S2 described above whether the alternating-current power supply 2 is a 100-V alternating-current power supply on the basis of a voltage value detected by the voltage detection unit.

As the switching unit 11, a semiconductor switching element such as a triac may be used instead of the mechanical relay. Since the semiconductor switching element includes no contact that mechanically opens and closes, the semiconductor switching element does not deteriorate due to wear and does not generate a driving sound. With the use of the semiconductor switching element for the switching unit 11, the life of the direct-current bus power supply 4 is prolonged and quietness can be obtained.

The direct-current bus power supply 4 according to the first embodiment is not limited to one that outputs a direct-current voltage to the inverter circuit 6 that drives the motor 3, and may be one that outputs a direct-current voltage to a load other than the inverter circuit 6.

According to the first embodiment, the direct-current bus power supply 4 performs switching between the full-wave rectification and the voltage doubler rectification on the basis of the result of detecting the voltage value of the direct-current voltage and the result of determining the state of the load, thereby reducing wasteful power consumption due to boosting for the voltage doubler rectification. As a result, the direct-current bus power supply 4 achieves an effect that power consumption can be reduced.

Second Embodiment

Figure 5:
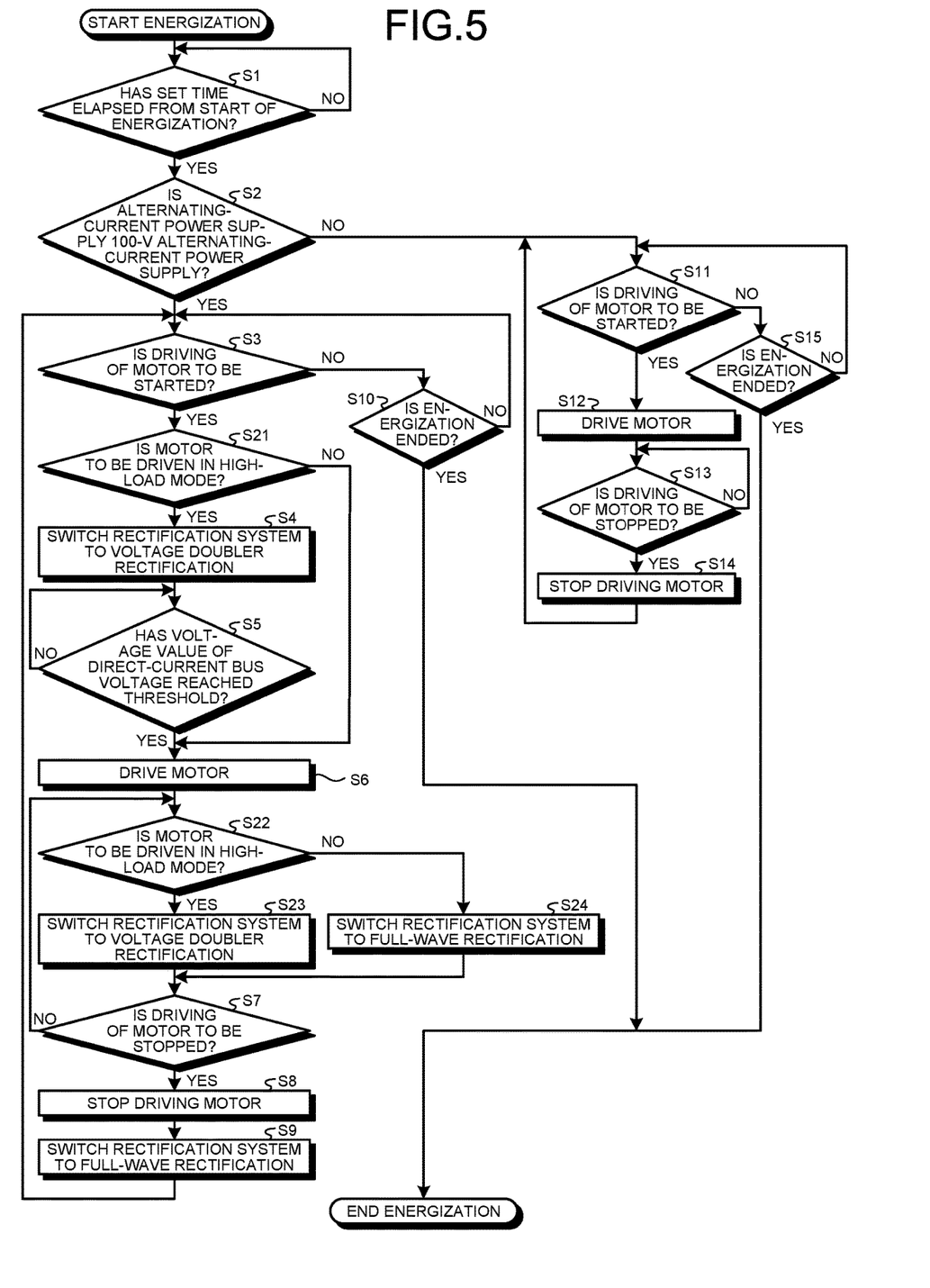
FIG. 5 is a flowchart illustrating an operation procedure of the motor drive device including the power supply device according to a second embodiment of the present invention.

FIG. 5 is a flowchart illustrating an operation procedure of the motor drive device including the power supply device according to a second embodiment of the present invention. The motor drive device 1 including the power supply device according to the second embodiment has a configuration similar to that of the motor drive device 1 of the first embodiment. The direct-current bus power supply 4 which is the power supply device according to the second embodiment switches the rectification system on the basis of a load when the motor 3 is driven. In the second embodiment, the same components as those in the first embodiment described above are denoted by the same reference numerals, and a configuration different from that in the first embodiment will mainly be described.

The motor drive device 1 can drive the motor 3 while switching a mode between a high-load mode and a low-load mode. Here, between two modes in which the numbers of rotations per unit time are different from each other, the high-load mode is a mode in which the number of rotations is larger, that is, a mode in a case where the motor 3 is driven with high energy. The low-load mode is a mode in which the number of rotations is smaller between switchable modes of the two modes, that is, a mode in a case where the motor 3 is driven with low energy.

The procedure from step S1 to step S3 illustrated in FIG. 5 is similar to that in the case of FIG. 4. If it is determined in step S3 to start driving the motor 3 (step S3, Yes), the control unit 7 determines in step S21 whether to drive the motor 3 in the high-load mode.

The control unit 7 determines whether to drive the motor 3 in the high-load mode in accordance with an external input signal. If it is determined to drive the motor 3 in the high-load mode (step S21, Yes), the motor drive device 1 advances the procedure to step S4. If it is determined to drive the motor 3 in the low-load mode instead of the high-load mode (step S21, No), the motor drive device 1 advances the procedure to step S6.

Here, an example of the external input signal will be described. In a case where the motor drive device 1 is applied to a hand dryer capable of switching an air volume, the external input signal is a signal indicating a designated air volume. An external input signal from the hand dryer is input to the control unit 7. Assuming that the hand dryer can switch the air volume between "high" and "low", in a case where an external input signal indicating that "high" has been designated is input, the control unit 7 determines to drive the motor 3 in the high-load mode. In a case where an external input signal indicating that "low" has been designated is input, the control unit 7 determines to drive the motor 3 in the low-load mode.

In a case where the motor drive device 1 is applied to a ventilator capable of switching an air volume, the external input signal is a signal from a switch or a remote controller of the ventilator, and is a signal indicating a designated air volume. Assuming that the ventilator can switch the air volume between "high" and "low", in a case where an external input signal indicating that "high" has been designated is input, the control unit 7 determines to drive the motor 3 in the high-load mode.

In a case where an external input signal indicating that "low" has been designated is input, the control unit 7 determines to drive the motor 3 in the low-load mode. In the case where the motor drive device 1 is applied to the ventilator capable of switching an air volume, the external input signal may be a signal other than the signal from the switch or the remote controller. In a case of a ventilator in which the air volume is set to "high" when a $CO_2$ concentration is higher than a threshold, and the air volume is set to "low" when the $CO_2$ concentration is lower than the threshold, the external input signal may be a signal indicating a detection result of the $CO_2$ concentration obtained by a $CO_2$ sensor. In a case where an external input signal indicating that a $CO_2$ concentration higher than the threshold has been detected is input, the control unit 7 determines to drive the motor 3 in the high-load mode. In a case where an external input signal indicating that a $CO_2$ concentration lower than the threshold has been detected is input, the control unit 7 determines to drive the motor 3 in the low-load mode.

In a case of a ventilator in which the air volume is set to "high" when the number of persons in a space to be ventilated by the ventilator is larger than a threshold, and the air volume is set to "low" when the number of persons in the space to be ventilated by the ventilator is smaller than the threshold or there is no person in the space, the external input signal may be a signal indicating a detection result of the number of persons obtained by a human detection sensor. In a case where an external input signal indicating that the number of persons is larger than the threshold is input, the control unit 7 determines to drive the motor 3 in the high-load mode. In a case where an external input signal indicating that the number of persons is smaller than the threshold or that there is no person is input, the control unit 7 determines to drive the motor 3 in the low-load mode.

In a case where the motor drive device 1 is applied to a vacuum cleaner capable of switching suction power, the external input signal is a signal from a switch of the vacuum cleaner, and is a signal indicating designated suction power. Assuming that the vacuum cleaner can switch the suction power between "high" and "low", in a case where an external input signal indicating that "high" has been designated is input, the control unit 7 determines to drive the motor 3 in the high-load mode. In a case where an external input signal indicating that "low" has been designated is input, the control unit 7 determines to drive the motor 3 in the low-load mode.

In a case of a vacuum cleaner in which the suction power is switched on the basis of the presence or absence of contact between a head of the vacuum cleaner and a floor surface, the external input signal may be a signal from a floor surface detection sensor. In such a vacuum cleaner, the suction power is set to "high" when the contact with the floor surface is detected, and the suction power is set to "low" when the contact with the floor surface is not detected. In a case where an external input signal indicating that the contact with the floor surface has been detected is input, the control unit 7 determines to drive the motor 3 in the high-load mode. In a case where the external input signal indicating that the contact with the floor surface has been detected is not input, the control unit 7 determines to drive the motor 3 in the low-load mode.

In a case where the motor drive device 1 is applied to an automatic door opener/closer, the control unit 7 determines to drive the motor 3 in the low-load mode when an external input signal indicating that a passerby or an object is approaching a door is input. In a case where an external input signal indicating that a passerby or an object has moved away from the door is input, the control unit 7 determines to drive the motor 3 in the high-load mode.

The control unit 7 is not limited to one that determines whether to drive the motor 3 in the high-load mode in accordance with the external input signal. The control unit 7 may determine whether to drive the motor 3 in the high-load mode on the basis of internal data stored in the control unit 7. The internal data is time information, information on an integrated operation time of a device including the motor drive device 1 or a use frequency of an instrument including the motor drive device 1, or the like.

If it is determined in step S21 to drive the motor 3 in the high-load mode (step S21, Yes), the switching unit 11 switches the rectification system from the full-wave rectification to the voltage doubler rectification in step S4. The procedure of steps S4 and S5 illustrated in FIG. 5 is similar to the procedure illustrated in FIG. 4. After step S5, the motor drive device 1 advances the procedure to step S6. As a result, when the motor 3 is driven in the high-load mode, the direct-current bus power supply 4 performs the voltage doubler rectification of the alternating-current voltage.

If it is determined in step S21 to drive the motor 3 in the low-load mode (step S21, No), the motor drive device 1 skips steps S4 and S5 and advances the procedure to step S6. As a result, when the motor 3 is driven in the low-load mode, the direct-current bus power supply 4 performs the full-wave rectification of the alternating-current voltage.

After the motor 3 is driven in step S6, the control unit 7 determines in step S22 whether to drive the motor 3 in the high-load mode similarly to step S21. If it is determined to drive the motor 3 in the high-load mode (step S22, Yes), the switching unit 11 switches the rectification system to the voltage doubler rectification in step S23. Thereafter, the motor drive device 1 advances the procedure to step S7. In a case where the rectification system is switched to the voltage doubler rectification in step S4, the switching unit 11 continues the voltage doubler rectification.

If it is determined to drive the motor 3 in the low-load mode (step S22, No), the switching unit 11 switches the rectification system to the full-wave rectification in step S24. Thereafter, the motor drive device 1 advances the procedure to step S7. In a case where step S4 is skipped and thereby the rectification system remains to be the full-wave rectification, the switching unit 11 continues the full-wave rectification.

As described above, when the mode for driving the motor 3 is changed from the high-load mode to the low-load mode, the direct-current bus power supply 4 switches the rectification system from the voltage doubler rectification to the full-wave rectification. The direct-current bus power supply 4 switches the rectification system from the full-wave rectification to the voltage doubler rectification when the mode for driving the motor 3 is changed from the low-load mode to the high-load mode. The direct-current bus power supply 4 continues the voltage doubler rectification when continuing the high-load mode. The direct-current bus power supply 4 continues the full-wave rectification when continuing the low-load mode.

The procedure from step S7 to step S9 illustrated in FIG. 5 is similar to that in the case of FIG. 4. When the rectification system is switched in step S9, the motor drive device 1 returns the procedure to step S3 similarly to the case of FIG. 4. The procedure of step S10 illustrated in FIG. 5 and the procedure of steps S11 to S15 illustrated in FIG. 5 are similar to those in the case illustrated in FIG. 4.

In a case where the alternating-current power supply 2 is a 100-V alternating-current power supply, the direct-current bus power supply 4 performs the full-wave rectification of the alternating-current voltage in the driving state and the low-load mode. The direct-current bus power supply 4 performs the voltage doubler rectification of the alternating-current voltage only in a case of the driving state and the high-load mode. As a result, the direct-current bus power supply 4 can prevent unnecessary power consumption due to the voltage doubler rectification performed when the motor 3 is driven in the low-load mode.

According to the procedure illustrated in FIG. 5, the direct-current bus power supply 4 changes the rectification system in steps S23 and S24 while the motor 3 is driven. The motor drive device 1 may stop driving the motor 3 before changing the rectification system. In that case, the motor drive device 1 stops driving the motor 3 and then starts driving the motor 3 after the voltage value of the direct-current bus voltage reaches a preset voltage value. As a result, the motor drive device 1 can avoid the influence of voltage fluctuation due to the switching of the rectification system on the driving of the motor 3, and can stably drive the motor 3.

According to the procedure illustrated in FIG. 5, the direct-current bus power supply 4 switches the rectification system from the voltage doubler rectification to the full-wave rectification when the mode for driving the motor 3 is changed from the high-load mode to the low-load mode. The direct-current bus power supply 4 may continue the voltage doubler rectification when the mode is changed from the high-load mode to the low-load mode. For example, when the mode is changed in a short cycle between the high-load mode and the low-load mode as in a case of operating an electric fan in a rhythm wind mode in which the air volume is increased and decreased, the direct-current bus power supply 4 can avoid frequent switching of the rectification system by continuing the voltage doubler rectification. In a case where a mechanical relay is used for the switching unit 11, the direct-current bus power supply 4 can reduce deterioration of the switching unit 11 by avoiding the frequent switching by the switching unit 11, and thereby reliability can be maintained.

According to the second embodiment, similarly to the first embodiment, the direct-current bus power supply 4 performs switching between the full-wave rectification and the voltage doubler rectification on the basis of the result of detecting the voltage value of the direct-current voltage and the result of determining the state of the load, thereby reducing wasteful power consumption due to boosting for the voltage doubler rectification. In addition, the direct-current bus power supply 4 further reduces power consumption by performing the voltage doubler rectification only when the motor 3 is driven in the high-load mode. As a result, the direct-current bus power supply 4 achieves an effect that power consumption can be reduced.

Third Embodiment

Figure 6:
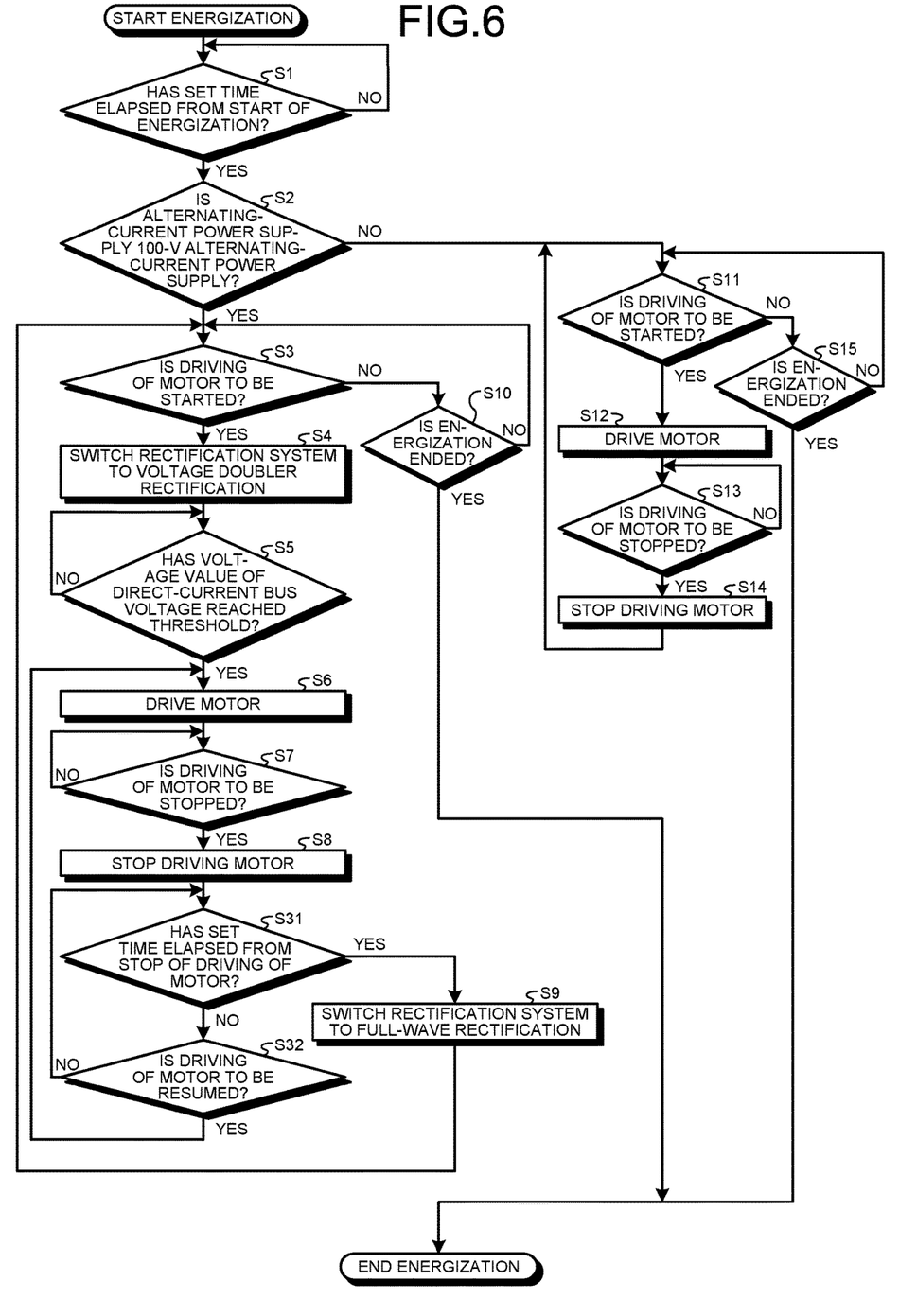
FIG. 6 is a flowchart illustrating an operation procedure of the motor drive device including the power supply device according to a third embodiment of the present invention.

FIG. 6 is a flowchart illustrating an operation procedure of the motor drive device including the power supply device according to a third embodiment of the present invention. The motor drive device 1 including the power supply device according to the third embodiment has a configuration similar to that of the motor drive device 1 of the first embodiment. The direct-current bus power supply 4 which is the power supply device according to the third embodiment switches the rectification system after the elapse of a set time from the stop of the driving of the motor 3. In the third embodiment, the same components as those in the first and second embodiments described above are denoted by the same reference numerals, and a configuration different from those in the first and second embodiments will mainly be described.

The procedure from step S1 to step S8 illustrated in FIG. 6 is similar to that in the case of FIG. 4. When the driving of the motor 3 is stopped in step S8, the control unit 7 determines in step S31 whether a set time has elapsed from the stop of the driving of the motor 3 in step S8. The set time is a preset time and is a time up to when the motor 3 is driven next. The set time is, for example, about 10 seconds. If the control unit 7 determines that the set time has elapsed (step S31, Yes), the switching unit 11 switches the rectification system from the voltage doubler rectification to the full-wave rectification in step S9. As described above, the switching unit 11 switches the rectification system from the voltage doubler rectification to the full-wave rectification after the elapse of the set time from the stop of the driving of the motor 3. When the rectification system is switched in step S9, the motor drive device 1 returns the procedure to step S3 similarly to the case of FIG. 4.

If the control unit 7 determines that the set time has not elapsed (step S31, No), the control unit 7 determines in step S32 whether to resume driving the motor 3. Similarly to step S3, the control unit 7 determines whether to resume driving the motor 3 in accordance with the external input signal or by using the internal data. If the control unit 7 determines not to resume driving the motor 3 (step S32, No), the motor drive device 1 repeats the procedure of step S31. If the control unit 7 determines to resume driving the motor 3 (step S32, Yes), the motor drive device 1 returns the procedure to step S6. The procedure of step S10 illustrated in FIG. 6 and the procedure of steps S11 to S15 illustrated in FIG. 6 are similar to those in the case illustrated in FIG. 4.

As described above, by switching the rectification system to the full-wave rectification after the elapse of the set time from the stop of the driving of the motor 3, the direct-current bus power supply 4 continues the voltage doubler rectification for the set time from the stop of the driving of the motor 3. In a case where the driving of the motor 3 is resumed before the elapse of the set time from the stop of the driving of the motor 3, the charging time of the capacitors 9a and 9b becomes unnecessary by the direct-current bus power supply 4 continuing the voltage doubler rectification. Therefore, the direct-current bus power supply 4 can shorten a time up to when the driving of the motor 3 is resumed. The direct-current bus power supply 4 according to the third embodiment is suitable when the motor 3 is frequently driven and stopped being driven.

When a hand is detected in a hand insertion portion, a hand dryer drives the motor 3 to thereby eject an air flow. In a case of the hand dryer, it is required to eject an air flow immediately after a hand is inserted into the hand insertion portion. In a time slot when there are many users of the hand dryer or in a case where the hand dryer is installed in a place where there are many users, an interval from when a certain user uses the hand dryer to when a subsequent user uses the hand dryer is, for example, about 10 seconds or less. By applying the direct-current bus power supply 4 according to the third embodiment to the hand dryer, it is possible to quickly resume the ejection of the airflow after the ejection of the airflow is stopped, so that a user can comfortably use the hand dryer.

Some vacuum cleaners have a function of stopping driving when idling continues for a certain period of time in a driving state. A vacuum cleaner having such a function stops suction when a certain period of time has elapsed in a state in which contact between a head and a floor surface is not detected, and resumes the suction when the contact between the head and the floor surface is detected after the suction is stopped. Such a vacuum cleaner is required to resume the suction immediately after the head comes into contact with the floor surface. An interval from when the head is lifted from the floor surface to when the head is placed on the floor surface is, for example, about five seconds or less. By applying the direct-current bus power supply 4 according to the third embodiment to the vacuum cleaner, it is possible to resume the suction immediately after the suction is stopped, so that a user can comfortably use the vacuum cleaner.

An automatic door opener/closer opens a door by driving the motor 3 when a passerby or a moving object approaches the door. In a case of the automatic door opener/closer, it is required to open the door immediately when a passerby or an object reaches a certain position. In a time slot when there are many passersby, or in a case where the automatic door opener/closer is installed in a place where there are many passersby, an interval from when a certain passerby passes the door to when a subsequent passerby passes the door is, for example, about 10 seconds or less. By applying the direct-current bus power supply 4 according to the third embodiment to the automatic door opener/closer, it is possible to open the door immediately after the door is closed, so that a passerby can pass the door comfortably.

According to the third embodiment, similarly to the first embodiment, the direct-current bus power supply 4 performs switching between the full-wave rectification and the voltage doubler rectification on the basis of the result of detecting the voltage value of the direct-current voltage and the result of determining the state of the load, thereby reducing wasteful power consumption due to boosting for the voltage doubler rectification. Furthermore, the direct-current bus power supply 4 switches the rectification system from the voltage doubler rectification to the full-wave rectification after the elapse of the set time from the stop of the driving of the motor 3, and thereby it is possible to shorten the time up to when the driving of the motor 3 is resumed.

Fourth Embodiment

Figure 7:
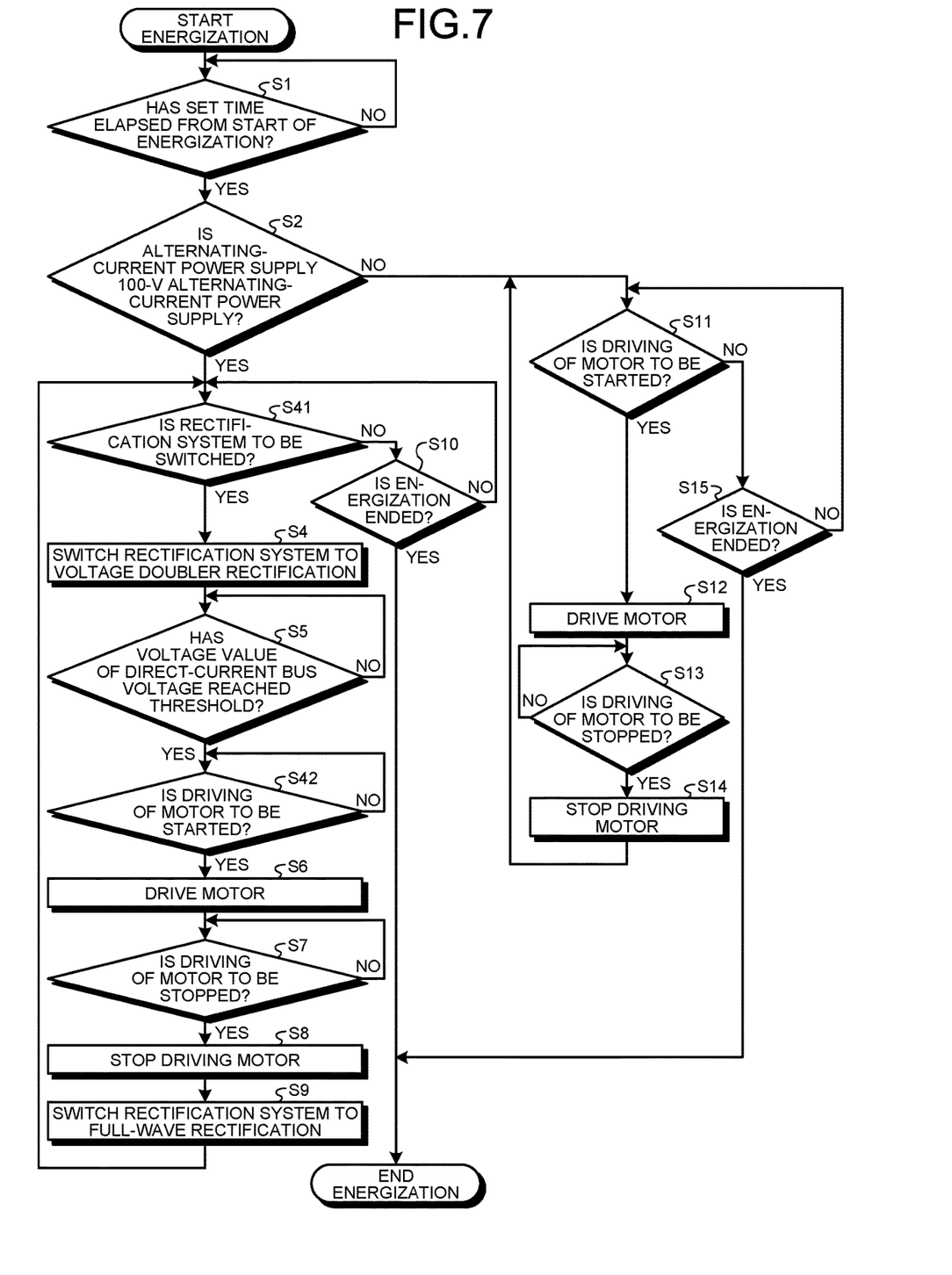
FIG. 7 is a flowchart illustrating an operation procedure of the motor drive device including the power supply device according to a fourth embodiment of the present invention.

FIG. 7 is a flowchart illustrating an operation procedure of the motor drive device including the power supply device according to a fourth embodiment of the present invention. The motor drive device 1 including the power supply device according to the fourth embodiment has a configuration similar to that of the motor drive device 1 of the first embodiment. The direct-current bus power supply 4 which is the power supply device according to the fourth embodiment switches the rectification system to the voltage doubler rectification before determining whether to start driving the motor 3. In the fourth embodiment, the same components as those in the first to third embodiments described above are denoted by the same reference numerals, and a configuration different from those in the first to third embodiments will mainly be described.

The procedure of steps S1 and S2 illustrated in FIG. 7 is similar to that in the case of FIG. 4. If it is determined in step S2 that the alternating-current power supply 2 is a 100-V alternating-current power supply (step S2, Yes), the control unit 7 determines in step S41 whether to switch the rectification system from the full-wave rectification to the voltage doubler rectification. If it is determined to switch the rectification system (step S41, Yes), the motor drive device 1 advances the procedure to step S4. If it is determined not to switch the rectification system (step S41, No), the motor drive device 1 advances the procedure to step S10.

Similarly to the case of the determination in step S3 illustrated in FIG. 4, the control unit 7 determines whether to switch the rectification system in accordance with the external input signal or on the basis of the internal data. If it is determined in step S41 to switch the rectification system (step S41, Yes), the switching unit 11 switches the rectification system from the full-wave rectification to the voltage doubler rectification in step S4. The procedure of steps S4 and S5 illustrated in FIG. 7 is similar to that in the case of FIG. 4.

If it is determined in step S5 that the voltage value of the direct-current bus voltage has reached the threshold (step S5, Yes), the control unit 7 determines in step S42 whether to start driving the motor 3. Similarly to step S3 illustrated in FIG. 4, the control unit 7 determines whether to start driving the motor 3 in accordance with the external input signal or on the basis of the internal data.

If the control unit 7 determines not to start driving the motor 3 (step S42, No), the motor drive device 1 repeats the procedure of step S42. If the control unit 7 determines to start driving the motor 3 (step S42, Yes), the motor drive device 1 drives the motor 3 in step S6. The procedure from step S7 to step S9 illustrated in FIG. 7 is similar to that in the case of FIG. 4. When the rectification system is switched in step S9, the motor drive device 1 returns the procedure to step S41.

If it is determined in step S41 not to switch the rectification system (step S41, No), the control unit 7 determines in step S10 whether the energization of the motor drive device 1 is ended. If the energization is not ended (step S10, No), the motor drive device 1 returns the procedure to step S41. If the energization is ended (step S10, Yes), the motor drive device 1 ends the operation in accordance with the procedure illustrated in FIG. 7. The procedure from step S11 to step S15 illustrated in FIG. 7 is similar to that in the case illustrated in FIG. 4.

As described above, by switching the rectification system to the voltage doubler rectification before determining whether to start driving the motor 3, the direct-current bus power supply 4 can start charging the capacitors 9a and 9b before determining to start driving the motor 3. As a result, the direct-current bus power supply 4 can shorten the time up to when the driving of the motor 3 by the voltage doubler rectification is started. The direct-current bus power supply 4 according to the fourth embodiment is suitable when the motor 3 is required be started being driven quickly.

Some hand dryers detect a user approaching the hand dryer before the user inserts the hand into a hand insertion portion. Such a hand dryer operates a hand detection sensor in response to detection of the user by a human detection sensor, and drives the motor 3 when the hand detection sensor detects a hand. The control unit 7 may determine to switch the rectification system to the voltage doubler rectification when an external input signal indicating that a user has been detected is input. In that case, the direct-current bus power supply 4 can switch the rectification system about three seconds before the hand is inserted, for example. By applying the direct-current bus power supply 4 according to the fourth embodiment to the hand dryer, it is possible to start driving the motor 3 quickly, so that a user can comfortably use the hand dryer.

Some ventilators have a function of starting ventilation at a set time. A ventilator having such a function drives the motor 3 at the set time. The control unit 7 may determine to switch the rectification system to the voltage doubler rectification before the set time. In that case, the direct-current bus power supply 4 switches the rectification system about 10 seconds before the set time, for example. By applying the direct-current bus power supply 4 according to the fourth embodiment to the ventilator, it is possible to start driving the motor 3 at precisely the set time.

Assuming that the automatic door opener/closer drives the motor 3 when a position of a passerby or a position of an object is detected to be two meters away from a door, for example, the control unit 7 may determine to switch the rectification system to the voltage doubler rectification when the position of the passerby or the position of the object is detected to be five meters away from the door. In that case, the direct-current bus power supply 4 switches the rectification system before the passerby or the moving object approaches a position two meters from the door. By applying the direct-current bus power supply 4 according to the fourth embodiment to the automatic door opener/closer, it is possible to start driving the motor 3 quickly, so that a passerby can pass the door comfortably.

According to the fourth embodiment, similarly to the first embodiment, the direct-current bus power supply 4 performs switching between the full-wave rectification and the voltage doubler rectification on the basis of the result of detecting the voltage value of the direct-current voltage and the result of determining the state of the load, thereby reducing wasteful power consumption due to boosting for the voltage doubler rectification. Furthermore, the direct-current bus power supply 4 switches the rectification system to the voltage doubler rectification before determining whether to start driving the motor 3, and thereby it is possible to shorten the time up to when the driving of the motor 3 is started.

The configurations described in each embodiment above are merely examples of the content of the present invention and can be combined with other known technology and part thereof can be omitted or modified without departing from the gist of the present invention.

REFERENCE SIGNS LIST 1 motor drive device; 2 alternating-current power supply; 3 motor; 4 direct-current bus power supply; voltage detection unit; 6 inverter circuit; 7 control unit; 8 diode bridge circuit; 9a, 9b capacitor; 10a, 10b direct-current bus; 11 switching unit; 21 processing circuitry; 22 input/output interface; 23 processor; 24 memory.

The invention claimed is:

1. A motor drive device that drives a motor, the motor drive device comprising:
a rectifier circuit to enable an alternating-current voltage to be rectified by respective rectification systems of full-wave rectification and voltage doubler rectification, and to output a direct-current voltage;
an inverter circuit to convert the direct-current voltage into an alternating-current voltage and to output the alternating-current voltage to the motor, the inverter circuit being capable of switching a state between a driving state in which the direct-current voltage is applied and the motor is driven and a standby state in which the direct-current voltage is applied and the motor is stopped being driven;
switching circuitry to perform switching between the full-wave rectification and the voltage doubler rectification; and
control circuitry to control the switching circuitry on a basis of a voltage value of the alternating-current voltage, the state of the inverter circuit, and an external input signal input to the motor drive device from an instrument outside the motor drive device or control information on the motor indicated by internal data stored in the motor drive device.

2. The motor drive device according to claim 1, wherein in a case where a voltage value of the alternating-current voltage is equal to or less than a reference value, the control circuitry controls the switching circuitry to switch a rectification system from the voltage doubler rectification to the full-wave rectification on a basis of the control information when the state of the inverter circuit is switched from the driving state to the standby state.

3. The motor drive device according to claim 2, wherein in a case where a voltage value of the alternating-current voltage is equal to or less than a reference value, the control circuitry controls the switching circuitry to switch a rectification system from the full-wave rectification to the voltage doubler rectification on a basis of the control information when the state of the inverter circuit is switched from the standby state to the driving state.

4. The motor drive device according to claim 2, wherein
the control information is information indicating an elapsed time from stop of driving of the motor, and
after the elapsed time exceeds a preset time, the control circuitry controls the switching circuitry to switch a rectification system from the voltage doubler rectification to the full-wave rectification.

5. The motor drive device according to claim 3, wherein the control circuitry controls the switching circuitry to switch a rectification system from the full-wave rectification to the voltage doubler rectification on a basis of the control information before starting driving the motor.

6. The motor drive device according to claim 1, wherein in a case where a voltage value of the alternating-current voltage is equal to or less than a reference value, the control circuitry controls the switching circuitry to switch a rectification system from the full-wave rectification to the voltage doubler rectification on a basis of the control information when the state of the inverter circuit is switched from the standby state to the driving state.

7. The motor drive device according to claim 6, wherein the control circuitry controls the switching circuitry to switch a rectification system from the full-wave rectification to the voltage doubler rectification on a basis of the control information before starting driving the motor.

8. The motor drive device according to claim 1, wherein
the motor is capable of being driven in two modes in which numbers of rotations per unit time are different from each other, and
the rectifier circuit performs the voltage doubler rectification of the alternating-current voltage when the motor is driven in, between the two modes, a mode in which the number of rotations is larger.

9. The motor drive device according to claim 8, wherein the rectifier circuit performs the full-wave rectification of the alternating-current voltage when the motor is driven in, between the two modes, a mode in which the number of rotations is smaller.

10. The motor drive device according to claim 8, wherein the rectifier circuit continues the voltage doubler rectification when a mode is changed from a mode in which the number of rotations is larger to a mode in which the number of rotations is smaller.

* * * * *